United States Patent
Hexsel et al.

(10) Patent No.: US 11,988,747 B2
(45) Date of Patent: *May 21, 2024

(54) TECHNIQUES FOR DOPPLER POINT SET REGISTRATION

(71) Applicant: AEVA, INC., Mountain View, CA (US)

(72) Inventors: Bruno Hexsel, Mountain View, CA (US); Heethesh Vhavle Naresh, Sunnyvale, CA (US)

(73) Assignee: Aeva, Inc., Mountain View, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/706,273

(22) Filed: Mar. 28, 2022

(65) Prior Publication Data

US 2022/0404496 A1     Dec. 22, 2022

Related U.S. Application Data

(63) Continuation of application No. 17/349,714, filed on Jun. 16, 2021, now Pat. No. 11,287,529.

(51) Int. Cl.
| | |
|---|---|
| *G01S 17/58* | (2006.01) |
| *G01S 17/89* | (2020.01) |
| *G06T 7/246* | (2017.01) |
| *G06T 7/33* | (2017.01) |

(52) U.S. Cl.
CPC ............. *G01S 17/58* (2013.01); *G01S 17/89* (2013.01); *G06T 7/248* (2017.01); *G06T 7/33* (2017.01); *G06T 2207/10028* (2013.01)

(58) Field of Classification Search
None
See application file for complete search history.

(56) References Cited

U.S. PATENT DOCUMENTS

| | | |
|---|---|---|
| 9,043,069 B1 | 5/2015 | Ferguson et al. |
| 2019/0370614 A1 | 12/2019 | Crouch et al. |
| 2020/0043186 A1 | 2/2020 | Selviah et al. |
| 2021/0141092 A1 | 5/2021 | Chen et al. |

FOREIGN PATENT DOCUMENTS

WO     2018138516 A1     8/2018

OTHER PUBLICATIONS

Bathymetric Factor Graph SLAM with Sparse Point Cloud Alignment, OCEANS 2015—MTS/IEEE Washington, https://ieeexplore.ieee.org/document/7404433, Oct. 19-22, 2015 (Year: 2015).
Non-Final Office Action Correspondence of U.S. Appl. No. 17/710,410 dated Dec. 26, 2023, 10 pages.

*Primary Examiner* — Hovhannes Baghdasaryan
(74) *Attorney, Agent, or Firm* — Womble Bond Dickinson (US) LLP

(57) ABSTRACT

A system and method including, predicting, using a sensor system, a first set of Doppler velocity information for a first point set to produce a first predicted set of Doppler velocity information for the first point set. The method includes determining one or more Doppler velocity errors based on the first predicted set of Doppler velocity information and a second set of Doppler velocity information measured for one or more points of the first point set. The method includes producing, in view of the one or more Doppler velocity errors, a transform that aligns the one or more points of the first point set with one or more points of a second point set to produce one or more scan frames.

20 Claims, 8 Drawing Sheets

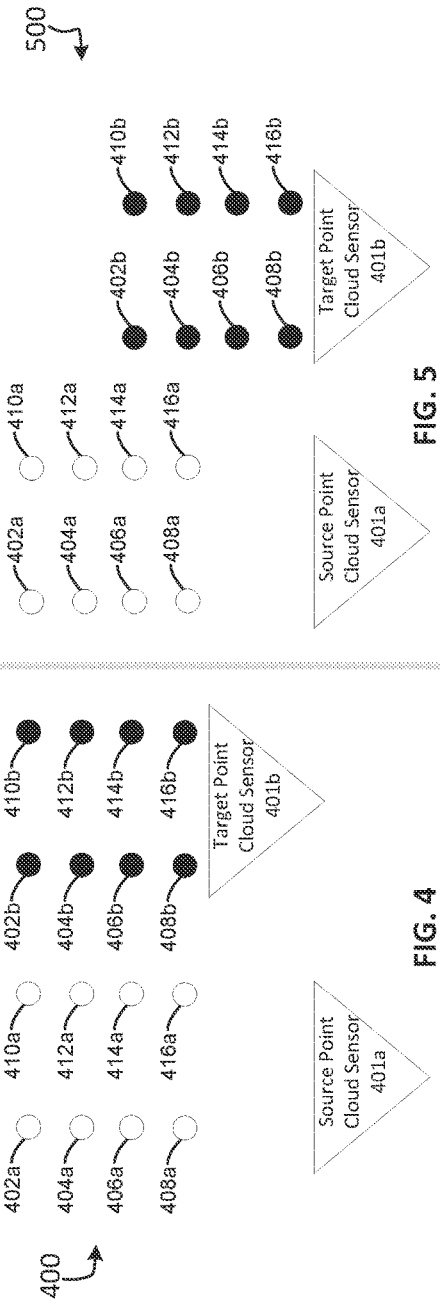
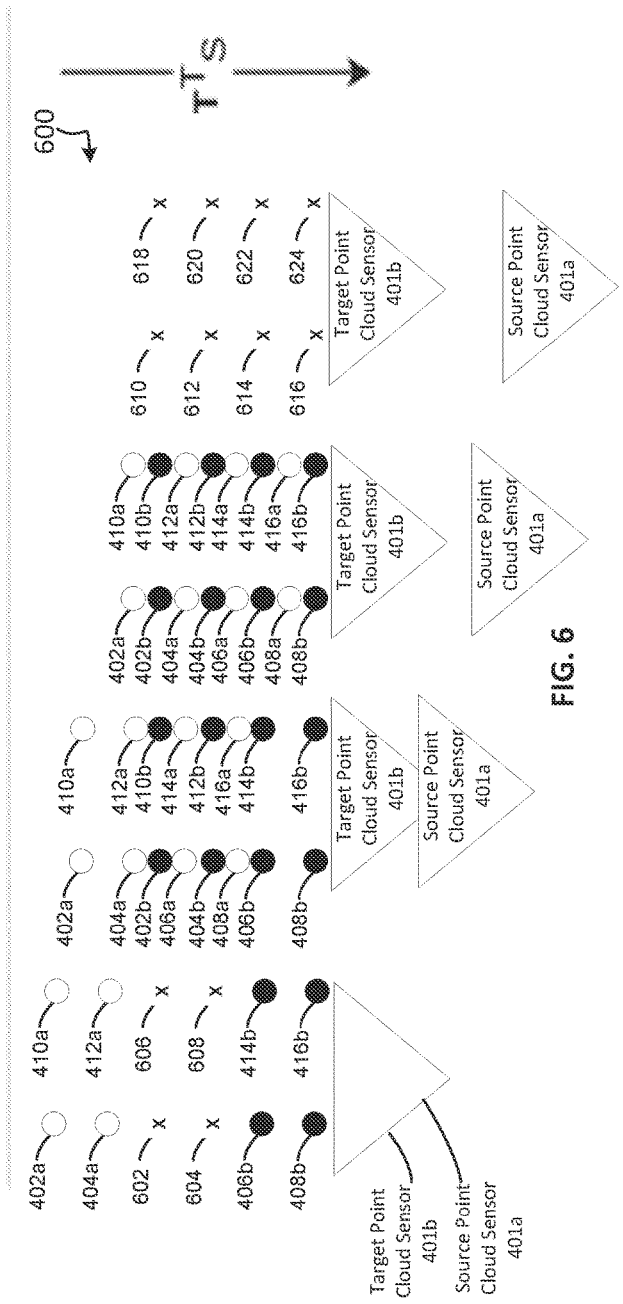

1000 determining an alignment between one or more points of a first point set, from the plurality of different point sets, and one or more points of a second point set, from the plurality of different point sets, based on geometry measurements and Doppler velocity measurements for the one or more points of the first point set and the second point set
1002 predicting a first set of Doppler velocity information for the first point set based on an initial motion estimate of a sensor system measured relative to one or more static object velocities corresponding to the one or more points for the first point set to produce a first predicted set of Doppler velocity information for the first point set
1004 comparing a second set of Doppler velocity information measured for the one or more points of the first point set and the first predicted set of Doppler velocity information to compute one or more Doppler velocity errors
1006 producing a transform that aligns the one or more points of the first point set with the one or more points of the second point set that approaches the point set convergence threshold to produce aligned point clouds in a common reference frame
1008

FIG. 10

TECHNIQUES FOR DOPPLER POINT SET REGISTRATION

RELATED APPLICATIONS

This application is a continuation of U.S. patent application Ser. No. 17/349,714, filed on Jun. 16, 2021, the entire contents of which is incorporated herein by reference in its entirety.

TECHNICAL FIELD

The present disclosure relates generally to optical detection, and more particularly to systems and methods for performing a Doppler point set registration.

BACKGROUND

Point set registration (sometimes referred to as, "point cloud registration" and "scan matching") is the process of aligning N-dimensional point clouds (e.g., two-dimensional (2D) or three-dimensional (3D)), where each point cloud corresponds to a set of data points representing one or more objects and/or space, into a common coordinate frame by estimating the rigid transformation between the point clouds. A rigid transformation is a geometric transformation of a Euclidean space (e.g., a shape) that preserves the Euclidean distance between every pair of points, such that the movement of the Euclidean space does not affect the size of the shape. A rigid transformation may include rotations, translations, and/or reflections.

SUMMARY

One aspect disclosed herein is directed to a method of aligning a plurality of different point sets to produce one or more scan frames. In some embodiments, the method includes determining an alignment between one or more points of a first point set, from the plurality of different point sets, and one or more points of a second point set, from the plurality of different point sets, based on geometry measurements and Doppler velocity measurements for the one or more points of the first point set and the second point set. In some embodiments, the method includes, provided the alignment does not satisfy a point set alignment threshold, wherein the point set alignment threshold represents a geometric alignment error threshold between the first and second point sets based on a first pair of corresponding points between the one or more points of both the first and second point sets: predicting a first set of Doppler velocity information for the first point set based on an initial motion estimate of a sensor system measured relative to one or more static object velocities corresponding to the one or more points for the first point set to produce a first predicted set of Doppler velocity information for the first point set, comparing a second set of Doppler velocity information measured for the one or more points of the first point set and the first predicted set of Doppler velocity information to compute one or more Doppler velocity errors; and/or producing a transform that aligns the one or more points of the first point set with the one or more points of the second point set that approaches the point set convergence threshold to produce one or more scan frames.

In some embodiments, the method includes computing, provided the point set alignment threshold is not satisfied, a difference between the first predicted set and the second set of Doppler velocity information to minimize the one or more Doppler velocity errors and one or more geometric measurement errors from the geometry measurements between the one or more points of both the first point set and the second point set to approach the point set convergence threshold.

In some embodiments, the method includes predicting a third set of Doppler velocity information for the second point set based on the initial motion estimate of a LIDAR system measured relative to one or more static object velocities corresponding to the one or more points for the second point set to produce a second predicted set of Doppler velocity information for the second point set. In some embodiments, the method includes selecting a second pair of corresponding points between the one or more points of both the first and second point sets based on the second predicted set of Doppler velocity information and the first set of Doppler velocity information measured for the one or more points of the first point set and rejecting correspondence pairs that exceed a Doppler velocity compatibility threshold to prevent optimizing on outlier correspondences or non-static points from the one or more points of both the first and second point sets.

In some embodiments, the method includes predicting, provided the point cloud convergence threshold is not satisfied and until the point cloud convergence threshold is satisfied, using a second pair of corresponding points based on a subsequent motion estimate of the sensor system between the one or more points of the first and second point sets, a third set of Doppler velocity information for the first point set based on a subsequent motion estimate of the sensor system measured relative to the one or more static object velocities to produce a second predicted set of Doppler velocity information for the first point set.

In some embodiments, the method includes comparing, provided the point cloud convergence threshold is not satisfied and until the point cloud convergence threshold is satisfied, using a second pair of corresponding points based on a subsequent motion estimate of the sensor system between the one or more points of the first and second point sets, the second set of Doppler velocity information and the second predicted set of Doppler velocity information to compute a new set of one or more Doppler velocity errors.

In some embodiments, the first and second point sets are point clouds. In some embodiments, the first point set is a point cloud and the second point set is a static map. In some embodiments, the initial motion estimate is based on a median Doppler velocity calculated using the first point set. In some embodiments, the transform comprises a subsequent motion estimate of the sensor system. In some embodiments, the first and second points sets are interchanged producing an inverse of rigid transformation to align the first and second points sets.

In another aspect, the present disclosure is directed to a system for aligning a plurality of different point sets to produce one or more scan frames. In some embodiments, the system includes a memory; and a processor, operatively coupled with the memory, to determine an alignment between one or more points of a first point set, from the plurality of different point sets, and one or more points of a second point set, from the plurality of different point sets, based on geometry measurements and Doppler velocity measurements for the one or more points of the first point set and the second point set.

In some embodiments, the system includes, provided the alignment does not satisfy a point set alignment threshold, wherein the point set alignment threshold represents a geometric alignment error threshold between the first and second point sets based on a first pair of corresponding points between the one or more points of both the first and second point sets: predict a first set of Doppler velocity information for the first point set based on an initial motion estimate of a sensor system measured relative to one or more static object velocities corresponding to the one or more points for the first point set to produce a first predicted set of Doppler velocity information for the first point set; compare a second set of Doppler velocity information measured for the one or more points of the first point set and the first predicted set of Doppler velocity information to compute one or more Doppler velocity errors; and/or produce a transform that aligns the one or more points of the first point set with the one or more points of the second point set that approaches the point set convergence threshold to produce one or more scan frames.

In some embodiments, the processor is to further, provided the point set alignment threshold is not satisfied, compute a difference between the first predicted set and the second set of Doppler velocity information to minimize the one or more Doppler velocity errors and one or more geometric measurement errors from the geometry measurements between the one or more points of both the first point set and the second point set to approach the point set convergence threshold.

In some embodiments, the processor is to further predict a third set of Doppler velocity information for the second point set based on the initial motion estimate of a LIDAR system measured relative to one or more static object velocities corresponding to the one or more points for the second point set to produce a second predicted set of Doppler velocity information for the second point set. In some embodiments, the processor is to further select a second pair of corresponding points between the one or more points of both the first and second point sets based on the second predicted set of Doppler velocity information and the first set of Doppler velocity information measured for the one or more points of the first point set and rejecting correspondence pairs that exceed a Doppler velocity compatibility threshold to prevent optimizing on outlier correspondences or non-static points from the one or more points of both the first and second point sets.

In some embodiments, the processor is to further, provided the point cloud convergence threshold is not satisfied and until the point cloud convergence threshold is satisfied, using a second pair of corresponding points based on a subsequent motion estimate of the sensor system between the one or more points of the first and second point sets, predict a third set of Doppler velocity information for the first point set based on a subsequent motion estimate of the sensor system measured relative to the one or more static object velocities to produce a second predicted set of Doppler velocity information for the first point set; and/or compare the second set of Doppler velocity information and the second predicted set of Doppler velocity information to compute a new set of one or more Doppler velocity errors.

In some embodiments, the first and second point sets are point clouds. In some embodiments, the first point set is a point cloud and the second point set is a static map. In some embodiments, the initial motion estimate is based on a median Doppler velocity calculated using the first point set. In some embodiments, the transform comprises a subsequent motion estimate of the sensor system. In some embodiments, the first and second points sets are interchanged producing an inverse of rigid transformation to align the first and second points sets.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

FIG. 4 is a block diagram depicting an example environment for inverting an estimated transformation using an ICP algorithm, according to some embodiments;

FIG. 5 is a block diagram depicting an example environment for inverting an estimated transformation using an ICP algorithm, according to some embodiments;

FIG. 6 is a block diagram depicting an example environment for inverting an estimated transformation using an ICP algorithm, according to some embodiments;

FIG. 10 is a flow diagram illustrating an example method for performing a Doppler point set registration, according to some embodiments.

DETAILED DESCRIPTION

Figure 1:
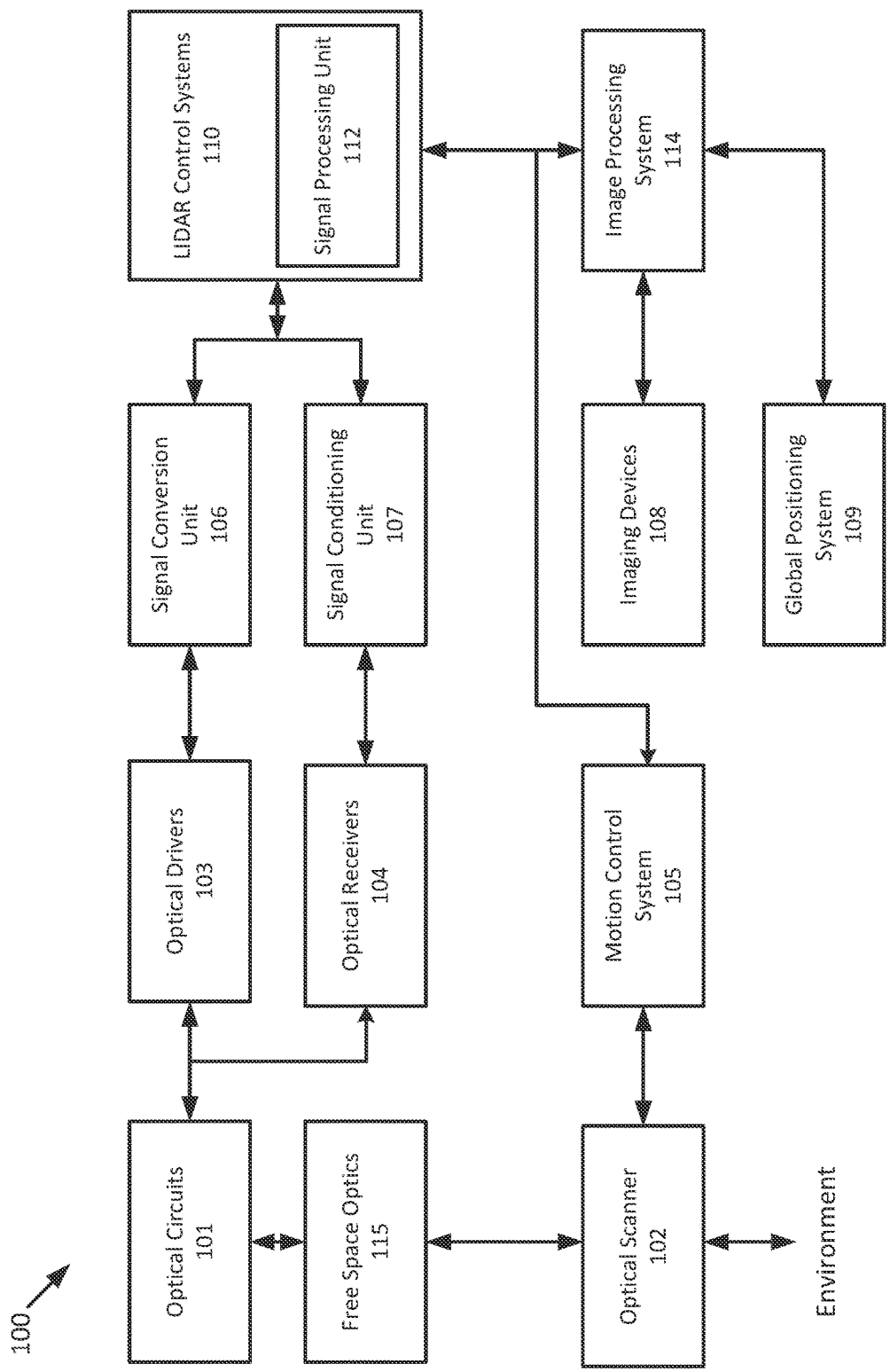
FIG. 1 is a block diagram illustrating an example of a LIDAR system, according to some embodiments.

According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

The position and orientation of a rigid body in space may include, for example, three components of translation and three components of rotation, which means that the body has six degrees of freedom, referred to as 6-DOF. A translation can include, for example, a rigid transformation that moves every point of an object (or a space) by the same distance in a given direction (e.g., across an x-y-z axis), while a rotation refers to a rigid transformation that moves the object but preserves the distance between the points and the center of rotation. In some embodiments, a rigid transformation may include a reflection of the object over a line such that each point of the object (e.g., a pre-image) has an image that is the same distance from the reflection line as the original point, but it is on an opposite side of the line.

Embodiments of the present disclosure can use several different registration techniques that may be used to perform a point set registration and/or rigid transformation of points clouds (sometimes referred to as, "point sets"). It should be noted that, although the term "point cloud" is used to describe various embodiments, embodiments of the present disclosure are not limited as such. For instance, embodiments of the present disclosure may use any system capable of obtaining (e.g., deriving, acquiring, receiving) different types of point sets, including, but no limited to, static maps, geometric structures reconstructed from stereo images or sequences of monocular images, point sets obtained from dense depth sensors such as Red, Green, Blue-Depth (RGB-D) cameras, and point sets obtained from acoustic/ultrasound sensors.

These techniques may be categorized as either a pairwise registration transformation, which are performed on only two point clouds, or a groupwise registration transformation, which are performed on more than two point clouds simultaneously. An Iterative Closest Point (ICP) is an example of a pairwise registration transformation that may be used to perform a point set registration and/or estimate relative rigid transformation to align point clouds with unknown correspondences.

The conventional methods, however, for performing a point set registration of point clouds using any of the registration algorithms fail when the point clouds correspond to scanning environments (e.g., free-space with or without one or more objects) that include ambiguities, such as one or more similar structures, one or more repetitive geometries (e.g., highways, hallways, tunnels, etc.), one or more feature-less indoor environments (e.g., smooth surfaces), and/or registration among scans exhibiting one or more circular (or other pre-defined ray-cast) patterns on the ground plane captured by most LIDAR sensors. Thus, there is a long-felt need in providing a mechanism for optimizing the point set registration on point clouds that have ambiguities.

Accordingly, the present disclosure is directed to systems and methods for performing a Doppler point set registration. That is, as described in the below passages with respect to one or more embodiments, the Doppler point set registration techniques described by embodiments use one or more radial gradient of Doppler velocities observed on one or more static points by Doppler measuring sensors (e.g. FMCW LIDARs, RADARs, etc.), along with other properties (e.g., geometry) of the point set scan, to recover (e.g., estimate, calculate, determine or the like) the sensor motion, thereby optimizing a rigid transformation between two point clouds to handle the ambiguities in a scanning environment. Furthermore, in some embodiments, the corresponding matches used for optimization may be improved by exploiting the compatibility of each point's Doppler measurement and/or the current sensor's rigid motion estimate.

Several applications and industries may benefit from a Doppler point set registration. For example, autonomous vehicle and robotic systems, including but not limited to estimating sensor/ego-vehicle odometry, generating more accurate HD maps (e.g., highway scenarios), and applications in Simultaneous Localization and Mapping (SLAM) pipelines. Consumer devices such as mobile phones, augmented reality headsets, and robotic home appliances such as vacuum cleaners may also benefit from Doppler based registration of point sets in feature-deficient indoor environments, where localization and mapping of the device can be significantly improved. Similarly, UAVs and commercial drones may also benefit in navigation and mapping applications in feature-less outdoor environments.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of an object in any free-space relative to the vehicle. In some embodiments, the vehicle may include a steering system and a braking system, each of which may work in combination with one or more LIDAR systems 100 according to any information (e.g., one or more rigid transformations, distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control system 110 may include a processing device that may be implemented with a DSP, such as signal processing unit 112. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
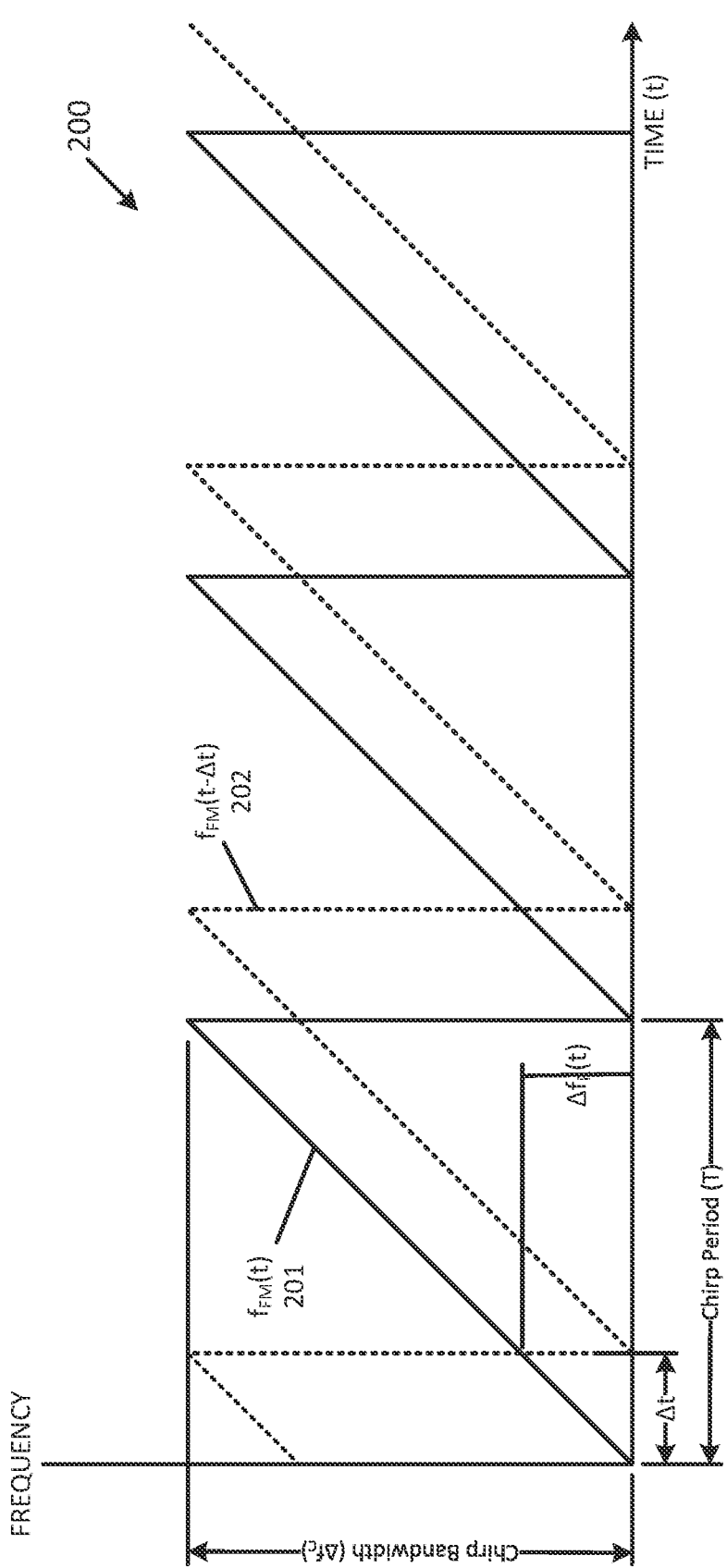
FIG. 2 is a time-frequency diagram illustrating an example of an FMCW scanning signal that can be used by a LIDAR system to scan a target environment, according to some embodiments.

FIG. 2 is a time-frequency diagram illustrating an example of an FMCW scanning signal that can be used by a LIDAR system to scan a target environment, according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct (e.g., adjust, modify) the frequency of the return signal, so the Doppler shift is not shown in FIG. 2 for simplicity and ease of explanation. For example, LIDAR system 100 may correct the frequency of the return signal by removing (e.g., subtracting, filtering) the Doppler shift from the frequency of the returned signal to generate a corrected return signal. The LIDAR system 100 may then use the corrected return signal to calculate a distance and/or range between the LIDAR system 100 and the object. In some embodiments, the Doppler frequency shift of target return signal 202 that is associated with an object may be indicative of a velocity and/or movement direction of the object relative to the LIDAR system 100.

It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
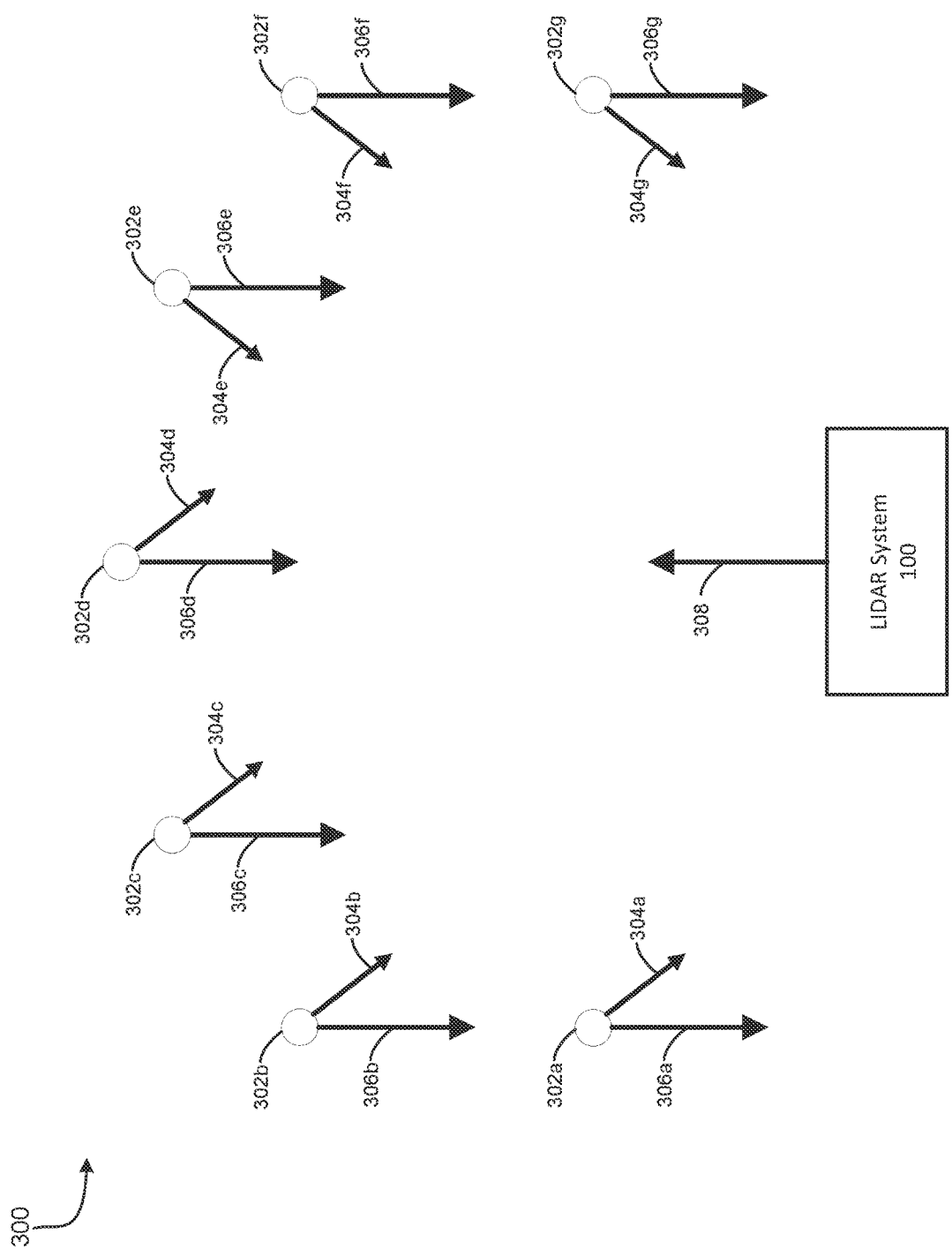
FIG. 3 is a block diagram depicting an example environment for measuring a Doppler point cloud using the LIDAR system 100 in FIG. 1, according to some embodiments.

FIG. 3 is a block diagram depicting an example environment for measuring a Doppler point cloud using one or more components of the LIDAR system 100 in FIG. 1, according to some embodiments. In some embodiments, the signal processing unit 112 of the LIDAR system 100 may be configured to measure the Doppler point cloud. The environment 300 includes the LIDAR system 100 and points 302a, 302b, 302c, 302d, 302e, 302f, 302g (collectively referred to as, "points 302a-302g"), where each point corresponds to a point of a point cloud. The environment 300 includes direction vectors 304a, 304b, 304c, 304d, 304e, 304f, 304g (collectively referred to as, "direction vectors 304a-304g") from the LIDAR system 100 to points 302a-302g. The environment 300 includes actual relative velocity vectors 306a, 306b, 306c, 306d, 306e, 306f, 306g (collectively referred to as, "actual relative velocity vectors 306a-306g"). The environment 300 includes ego velocity vectors 308a, 308b, 308c, 308d, 308e, 308f, 308g (collectively referred to as, "ego velocity vectors 308a-308g").

In some embodiments, the signal processing unit 112 of the LIDAR system 100 may be configured to predict and/or calculate one or more Doppler velocity vectors (sometimes referred to as, "Doppler information", "Doppler frequencies"). In some embodiments, the signal processing unit 112 may be configured to generate the Doppler velocities (scalar values) for each of the points 302a-302g by measuring and/or calculating the dot products of the direction vectors 304a-304g and the actual relative velocity vectors 306a-306g. For example, the signal processing unit 112 may generate a Doppler velocity (not shown in FIG. 3) for point 302a by measuring and/or calculating the dot product of direction vector 304a and the actual relative velocity vector 306a. In some embodiments, a Doppler velocity corresponds to a measurement of one of the actual relative velocity vectors 306a-306g along a respective one of the direction vectors 304a-304g.

In some embodiments, the signal processing unit 112 may be configured to predict a set of Doppler velocity information (e.g., a first set, a second set, and/or a third set, etc.) during in which one or more of the actual relative velocity vectors 306a-306g are unknown to the signal processing unit 112. In some embodiments, the signal processing unit 112 may be configured to estimate one or more of the ego velocity vectors 308a-308g (single vector here). In some embodiments, the signal processing unit 112 may be configured to determine whether one or more of the points 302a-302g are static (e.g., indicative of a static object) or dynamic (e.g., indicative of a moving object). In some embodiments, the signal processing unit 112 may be configured to determine that all (or a majority) of the points 302a-302g are static, and in response, determine that the actual relative velocity vector 306a-306g are the negative (or substantially negative) of the ego velocity vectors 308a-308g (e.g., just 308). In this instance, the actual relative velocity vectors 306a-306g may be referred to as estimated relative velocity vectors 306a-306g. In some embodiments, the signal processing unit 112 may be configured to determine one or more of the estimated direction vectors 304a-304g based on one or more of the points 302a-302g.

In some embodiments, the signal processing unit 112 may be configured to improve the accuracy of the signal processing unit 112 to predict the Doppler velocity by filtering out one or more (or all) of the dynamic points prior to the signal processing units 112 predicting the Doppler velocity. In some embodiments, the signal processing unit 112 may be configured to generate a predicted Doppler velocity (not shown in FIG. 3) for each of the points 302a-302g by measuring and/or calculating the dot products of the estimated direction vectors 304a-304g and the estimated relative velocity vectors 306a-306g.

In some embodiments, the LIDAR system 100 (or any component thereof) may acquire one or more point clouds (e.g., source point cloud, target point cloud). In some embodiments, a point cloud may include a plurality of points and/or a plurality of Doppler vectors (sometimes referred to as, "Doppler information", "Doppler frequencies", "Doppler velocities") where each Doppler vector may indicate that a respective point of the plurality of points corresponds to a negative velocity (sometimes referred to as, "a negative velocity") or a positive velocity, according to the respective point's Doppler vector. In some embodiments, a point cloud that includes Doppler information may be referred to as a "Doppler point cloud." It should be noted that, although the term "point cloud" is used to describe various embodiments, embodiments of the present disclosure are not limited as such. For instance, embodiments of the present disclosure may use any system capable of obtaining (e.g., deriving, acquiring, receiving) different types of point sets, including static maps, geometric structures reconstructed from stereo images or sequences of monocular images, point sets obtained from dense depth sensors such as Red, Green, Blue-Depth (RGB-D) cameras, and point sets obtained from acoustic/ultrasound sensors.

A negative velocity, in some embodiments, may indicate that one or more points are moving closer (e.g., toward) to the LIDAR system 100. For example, the point 302d may be a static point (a point/object with little to no movement) or a slower dynamic point (a point/object having a velocity that is less than the velocity of the LIDAR system 100), such that its Doppler vector 306d has a direction that is opposite (e.g., 180 degrees opposite) of the direction of the Doppler vector 308 of the LIDAR system 100, as shown in FIG. 3. A positive velocity, in some embodiments, may indicate that a point (e.g., corresponding to an object) is moving away from the LIDAR system 100. For example, point 302d may be a faster dynamic point (e.g., corresponding to an object having a velocity that is greater than the velocity of the LIDAR system 100), such that its Doppler vector has the same direction as the direction of the velocity vector 308 of the LIDAR system 100.

The LIDAR system 100, in some embodiments, may be configured to acquire (e.g., retrieve, receive, generate or the like) one or more points from a point cloud associated with the environment 300 in which the LIDAR system 100 is in and/or near. In some embodiments, the LIDAR system 100 may generate a point cloud, as discussed herein with respect to the description of FIG. 1 and/or FIG. 2. In some embodiments, the LIDAR system 100 may include a networking interface supporting one or more communication protocols (e.g., cellular, Wi-Fi, satellite, etc.) for sending a request to a remote database and/or server for a point cloud associated with the environment 300 to cause the remote database and/or server to transmit (e.g., send, deliver) one or more points of the point cloud to the LIDAR system 100. In some embodiments, the LIDAR system 100 may retrieve the point cloud from the remote database and/or server via the networking interface without having to send a request.

The LIDAR system 100, in some embodiments, may be configured to generate (e.g., compute, calculate, determine or the like) a Doppler velocity (sometimes referred to as, "Doppler velocity information") for a point based on the point's velocity vector by measuring a radial velocity which is the dot product (e.g., scalar product) with the direction (e.g., trajectory, orientation or the like) of observation of that point from the LIDAR system 100 and the negative of velocity of the point. In some embodiments, a Doppler velocity is a scalar value. In some embodiments, the Doppler velocity of a point is based on a velocity of the LIDAR system 100 and a velocity of the point with respect to the LIDAR system 100. In some embodiments, the LIDAR system 100 may associate and/or include a plurality of Doppler velocities (where each Doppler velocity is associated with a respective point of the plurality of points of a point cloud) within the point cloud. In some embodiments, the LIDAR system 100 may transmit, via a networking interface, the point cloud to a remote database or remote server to store the point cloud and/or a plurality of Doppler velocities in the remote database or remote server.

The LIDAR system 100, in some embodiments, may perform a Doppler point set registration by determining a plurality of radial distance vectors for a point cloud, where each radial distance vector is indicative of a distance (e.g., range) between the LIDAR system 100 and a respective point of the point cloud. In some embodiments, the LIDAR system 100 may determine a plurality of direction vectors for a point cloud, where each direction vector is indicative of a direction of observation of a respective point of the point cloud with respect to the LIDAR system 100. In some embodiments, the LIDAR system 100 may determine a plurality of direction vectors for a point cloud by normalizing the plurality of radial distance vectors for the point cloud.

The LIDAR system 100, in some embodiments, may determine a rigid motion estimate of the LIDAR system 100. In some embodiments, if a confidence threshold related to a rigid motion estimate of the sensor is not met, then the LIDAR system 100 may predict (e.g., forecast, estimate) an initial rigid motion estimate and a plurality of predicted Doppler velocities for a point cloud based on the initial motion estimate of the LIDAR system 100. In some embodiments, the LIDAR system 100 may predict an initial motion estimate before performing any measurements that are associated with the initial motion estimate. For example, the LIDAR system 100 may predict an initial motion estimate independent of a measurement of the initial motion estimate. As another example, the LIDAR system 100 may predict an initial motion estimate based on inertial measurements (e.g., measurements from a Micro Electro-Mechanical System (MEMS), fiber optics gyros (FOG), ring laser gyros (RLG)), Global Positioning Satellite (GPS) measurements, camera measurements, and/or a Doppler LIDAR system. In some embodiments, in the absence of any initial source of motion estimate, the motion estimate may just be initialized to zero (e.g., zero or a plurality of zeros). In some embodiments, the LIDAR system 100 may initialize the motion estimate to zero irrespective of whether the sensor is static or moving because the Doppler ICP algorithm will eventually converge to the correct motion estimate). The LIDAR system 100, in some embodiments, may minimize (e.g., reduce) the error in predicted Doppler velocities and Doppler velocity measurements acquired from the sensor.

The LIDAR system 100, in some embodiments, may estimate the transformation using a ICP algorithm (sometimes referred to as, Non-Doppler ICP), where the estimated transformation ($T_{TS}$) is the transformation that incrementally transforms (e.g., aligns) points in a source frame (e.g., a first point cloud) to register it to a target frame (e.g., a second point cloud). After Non-Doppler ICP converges, the LIDAR system 100 may apply the estimated transformation to the source point cloud to visualize (e.g., align) both the point clouds in the same frame of reference (e.g., in the target frame). In the case of a sensor (e.g., one or more sensors of LIDAR system 100) moving forward, this may mean that the estimated transformation ($T_{TS}$) actually represents the inverse of the sensor's odometry and/or the sensor's motion. In some embodiments, a LIDAR system 100 may invert (e.g., flip, reverse) the estimated transformation that is generated using Non-Doppler ICP, or switch the source and target point clouds to estimate the desired forward odometry.

FIG. 4 is a block diagram depicting an example environment for inverting an estimated transformation using Non-Doppler ICP, according to some embodiments. The environment 400 includes a source point cloud sensor (e.g., LIDAR system 100 in FIG. 1) and a target point cloud sensor (e.g., LIDAR system 100 in FIG. 1). The environment 400 includes points 402a, 404a, 406a, 408a, 410a, 412a, 414a, 416a (collectively referred to as, "points 402a-416a") of a source point cloud at a first time-stamp (e.g., time-stamp 0), where the source point cloud is generated by a source point cloud sensor 401a (e.g., LIDAR system 100). The environment 400 includes points 402b, 404b, 406b, 408b, 410b, 412b, 414b, 416b (collectively referred to as, "points 402b-416b") of a target point cloud at a second time-stamp (e.g., time-stamp 1), where the target point cloud is associated with a target point cloud sensor 401b (e.g., LIDAR system 100). The 8 point-measurements shown in both scans correspond to the same objects/targets detected in the real-world.

Thus, the environment 400 shows the two point clouds (e.g., source point cloud and target point cloud) in a fixed world frame and the point cloud sensors (e.g., one or more sensors of LIDAR system 100) can be seen moving forward, however, the point cloud would actually appear moving closer to the point cloud sensor.

FIG. 5 is a block diagram depicting an example environment for inverting the estimated transformation using Non-Doppler ICP, according to some embodiments. The environment 500 includes one or more components from environment 400, such as source point cloud sensor 401a, target point cloud sensor 401b, points 402a-416a of the source point cloud at a first time-stamp (e.g., time-stamp 0), and points 402b-416b of the target point cloud at a second time-stamp (e.g., time-stamp 1). However, the environment 500 shows the two point clouds (e.g., source point cloud and target point cloud) as seen from the fixed perspective of the source frame, such to cause the same point cloud measurements to appear closer to the point cloud sensor.

FIG. 6 is a block diagram depicting an example environment for inverting the estimated transformation using Non-Doppler ICP, according to some embodiments. The environment 600 includes one or more components from environment 400, such as source point cloud sensor 401a, target point cloud sensor 401b, points 402a-416a of the source point cloud at a first time-stamp (e.g., time-stamp 0) as detected by the source point cloud sensor 401a, and points 402b-416b of the target point cloud at a second time-stamp (e.g., time-stamp 1) as detected by the target point cloud sensor 401b. Some points are shown in the environment 600 as overlapping (e.g., intersecting, touching, crossing) points. For example, point 602 represents the overlapping of points 406a, 402b; point 604 represents the overlapping of points 408a, 404b; point 606 represents the overlapping of points 414a, 410b; and point 608 represents the overlapping of points 416a, 412b; point 610 represents the overlapping of points 402a, 402b; point 612 represents the overlapping of points 404a, 404b; point 614 represents the overlapping of points 406a, 406b; and point 616 represents the overlapping of points 408a, 408b. FIG. 6 shows the relative transform of the source point cloud sensor 401a and target point cloud sensor 401b to the points in environment 600. The source point cloud sensor 401a and target point cloud sensor 401b may partially overlap, completely overlap (as shown in FIG. 6 by a single triangle representing both the source point cloud sensor 401a and the target point cloud sensor 401b), or not overlap (e.g., the sensors are spaced apart).

Thus, the environment 600 shows how the LIDAR system 100 may incrementally estimate and/or move (e.g., register, align, transform) the source point cloud to the target point cloud frame, such that the estimated transformation ($T_{TS}$) actually represents the inverse of the sensor's motion or the inverse of the sensor's motion odometry.

The LIDAR system 100, in some embodiments, may estimate the transformation using a Doppler ICP algorithm ("Doppler ICP"). In Doppler ICP, in some embodiments, a state vector to optimize may represent the transformation corresponding to an estimated inverse transformation ($T_{ST}$), where it may be assumed that the time derivative of the transformation produces a positive direction of sensor velocity (e.g., indicating that the sensor is moving forward). In some embodiments, a time derivative may represent an instantaneous velocity and/or acceleration of an object. Thus, to optimize the state vector when using Doppler ICP, the equations used in the Non-Doppler ICP algorithm may, in some embodiments, be inverted by the LIDAR system 100 to produce an estimated inverse transformation ($T_{ST}$).

In some embodiments, the LIDAR system 100 may estimate the forward transform using Doppler ICP by generating an estimated transformation ($T_{TS}$) using geometry measurements. In some embodiments, the LIDAR system 100 may estimate the forward transform using Doppler ICP by generating an estimated transformation ($T_{TS}$) using geometry measurements In some embodiments, when estimating the transformation using Doppler ICP, the operation of "estimating ($T_{TS}$) using the geometry measurements" may be termed "estimating the forward transform" (this is the inverse odometry). In some embodiments, when estimating the transformation using Doppler ICP, the operation of "estimating ($T_{ST}$) may be termed "estimating the inverse transform" (this is the desired forward odometry). In some embodiments, the term "inverse" may be used to denote that the geometry measurements help optimize the state in an inverse manner in Doppler ICP. In Non-Doppler ICP and/or Doppler ICP, the target point cloud may be kept fixed and/or the source point cloud may be incrementally moved or transformed.

2.2 Doppler Point Set Registration Using Doppler ICP

In some embodiments, given two point clouds X (sometimes referred to as, "a source point cloud") and Y (sometimes referred to as, "a target point cloud"), and the correspondence set among the two point clouds K, the LIDAR system 100 may use Doppler ICP to jointly minimize (e.g., reduce, mitigate, decrease) or eliminate (e.g., remove, exclude, filter) the one or more error terms associated with Non-Doppler ICP, and/or optimize the state vector by using robust iterative non-linear least squares optimization (e.g., a Gauss-Newton or Levenberg-Marquardt method with robust kernels). In some embodiments, the LIDAR system 100 may compute Doppler velocity errors over each of the point clouds (e.g., source point cloud and target point cloud) individually based on the assumption that sensor velocity remains consistent at the instant when both the point clouds are measured.

In some embodiments, to minimize the effect of outliers or points where the predicted and expected Doppler measurements do not match, the one or more error terms of the Non-Doppler algorithm may be weighed individually and/or these weights may be obtained from robust kernels.

Figure 7:
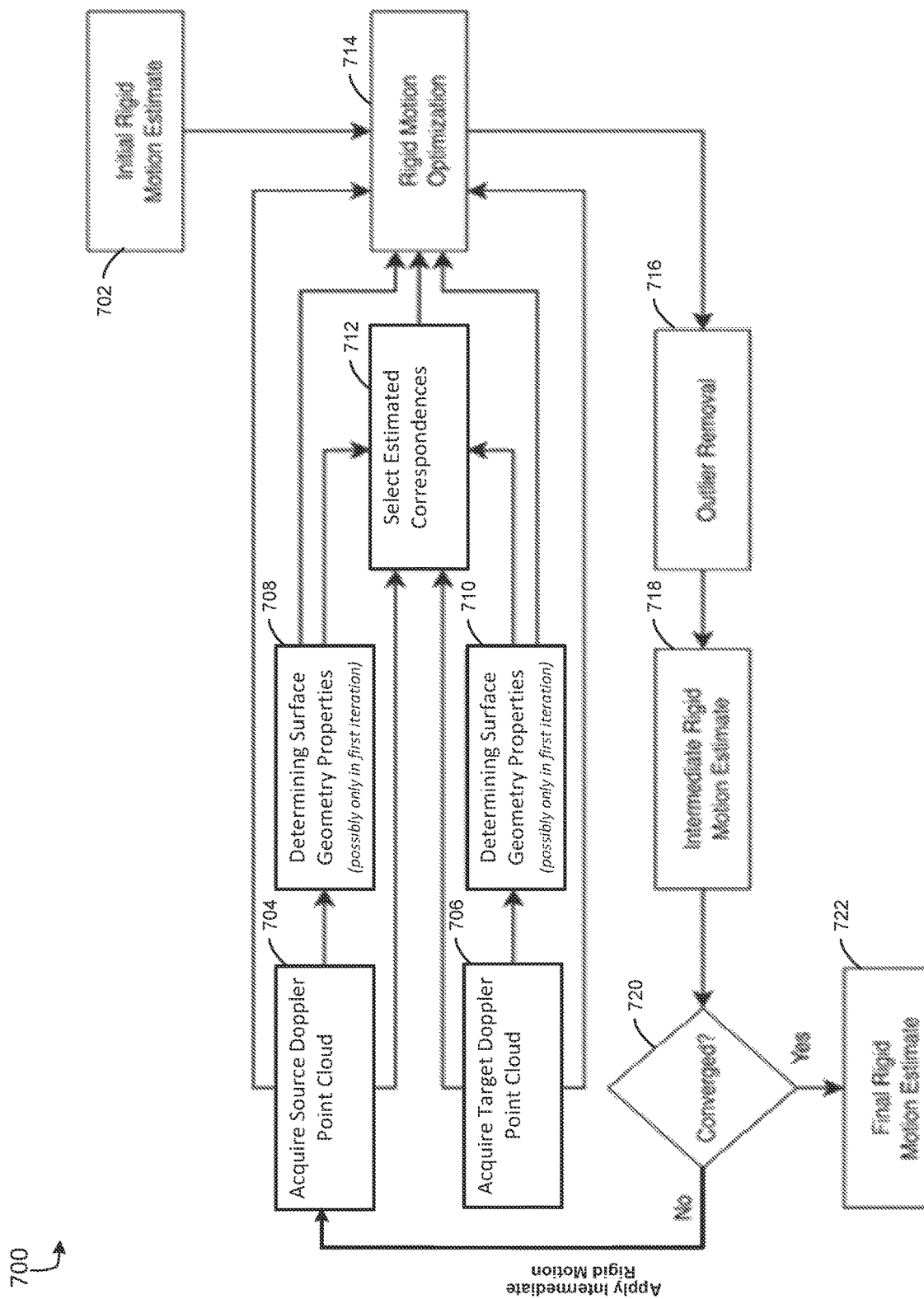
FIG. 7 is a flow diagram illustrating an example of a Doppler point set registration, according to some embodiments.

FIG. 7 is a flow diagram illustrating an example of a Doppler point set registration, according to some embodiments. Additional, fewer, or different operations may be performed in the method depending on the particular arrangement. In some embodiments, some or all operations of method 700 may be performed by one or more processors executing on one or more computing devices, systems, or servers (e.g., remote/networked servers or local servers). In some embodiments, method 700 may be performed by a signal processing unit, such as signal processing unit 112 in FIG. 1. Each operation may be re-ordered, added, removed, or repeated.

As described in the below passages, the signal processing unit 112 may be configured to estimate (e.g., evaluate, compute, determine) the motion between one or more points of a reference point cloud and/or map (e.g., static map) with respect to one or more points of a measured point cloud to determine one or more velocity measurements using an iterative rigid motion optimization enhanced by the Doppler velocity measurement of a set of points in a point cloud. The signal processing unit 112 may be configured to use the Doppler measurement (e.g., Doppler information, Doppler frequency offset/shift, etc.) to remove outliers (e.g., false reading, moving objects in the environment, etc.) and/or other outlier rejection mechanisms to check for point correspondences. The signal processing unit 112 may be configured to determine if the correspondences are deemed to have converged (e.g., the error between the measured point cloud and the reference point cloud or map is small enough), and in response to determining that the correspondences have converged, the signal processing unit 112 may be configured to finalize the optimization.

The signal processing unit 112, in some embodiments, may iteratively compute (e.g., determine) another motion stamp and estimate (e.g., determine) correspondences. In some embodiments, the correspondences could include regular correspondences (e.g., point proximity, surface normals, etc.), but are also enhanced by the Doppler signal. Whenever the optimization algorithm proposes a rigid motion, an expected Doppler measurement per point (in a point cloud) may be expected. The signal processing unit 112, in some embodiments, may be configured to use the error between the expectation and the measurement as another input for deriving a gradient in the direction of the rigid motion of the measured point cloud with respect to the actual point cloud for continual optimization. The signal processing unit 112, in some embodiments, may be configured to repeat the process until convergence is obtained.

As shown in FIG. 7, the method 700 may include the operation 702 of determining an initial rigid motion estimate. For example, the signal processing unit 112 may be configured to determine that it does not know the initial transformation between two point clouds (e.g., a source point cloud and a target point cloud). In response to making this determination, the signal processing unit 112 may be configured to determine and/or select an initial rigid motion estimate. In some embodiments, the signal processing unit 112 may be configured to select, for the initial rigid motion estimate, a zero translation and/or a zero rotation.

The method 700 include may include the operation 704 of obtaining (e.g., receiving, retrieving, collecting, acquiring) a source point cloud (sometimes referred to as, "a source point set") and/or the operation 706 of acquiring a target point cloud (sometimes referred to as, "a target point set"). In some embodiments, the source point cloud includes geometry information (e.g., geometry measurements) and/or Doppler information (e.g., Doppler information, Doppler frequency offset/shift, etc.) that are associated with the source point cloud. In some embodiments, the target point cloud includes geometry information and/or Doppler information that are associated with the target point cloud. Thus, in some embodiments, the source point cloud may be referred to as a source Doppler point cloud and/or the target point cloud may be referred to as a target Doppler point cloud In some embodiments, a source point cloud and/or a target point cloud may correspond to two different LIDAR scans (or data sets) that were collected at different moments in time by the LIDAR system 100. For example, the LIDAR system 100 may be configured to scan a region of free-space at a first duration of time (e.g., a first time stamp) and then scan a region (same or different) of free-space at a second duration of time (e.g., a second time stamp). In some embodiments, a source point cloud and a target point cloud may be successive (e.g., consecutive). For example, the LIDAR system 100 may be configured to scan a region of free-space for a duration of time to acquire a plurality of data sets, where a source point cloud may correspond to the LIDAR scan taken at time stamp t, and a target point cloud may correspond to the next LIDAR scan, indicated by timestamp t+1.

In some embodiments, a source point cloud and a target point cloud are not successive. For example, a source point cloud may correspond to a LIDAR scan taken at time stamp t, and a target point cloud may correspond to a LIDAR scan taken at any time stamp t+n, where n is greater than 1. In some embodiments, the LIDAR system 100 may be configured to scan a region of free-space for a first duration of time to acquire a source point cloud, and then scan a region (same or different) of free-space for a second duration of time to acquire a target point cloud, where the first duration and the second duration correspond to different durations of time. In some embodiments, the LIDAR system 100 may include a networking interface supporting one or more communication protocols (e.g., cellular, Wi-Fi, satellite, etc.) for sending a request to a remote database and/or server for a point cloud associated with a region of free-space near the LIDAR system 100, to cause the remote database and/or server to transmit the point cloud to the LIDAR system 300. In some embodiments, the LIDAR system 100 (e.g., signal processing unit 112) may be configured to retrieve the point cloud from the remote database and/or server via the networking interface without sending a request.

The method 700 may include the operation 708 of determining (e.g., generating, computing, calculating) surface geometry properties (e.g., surface normals, etc.) and/or non-geometric properties that are associated with and/or based on the source Doppler point cloud. In some embodiments, surface geometry properties (or features) may include 3D-point measurements, surface normals, direction vector (to the measured point), curvature, 2nd order moment invariant, neighborhood statistics, and other geometric features that could be a function of the listed properties and/or the Doppler velocity measurements. In some embodiments, non-geometric properties may include other sensor measurements such as intensity, reflectivity, and/or the color of the point obtained by projecting it to the image.

The method 700 may include the operation 710 of determining surface geometry properties associated with and/or based on the target Doppler point cloud. In some embodiments, the signal processing unit 112 may be configured to only perform operation 708 and/or operation 710 during a first iteration of the method 700, and therefore, use these same values from the first iteration for one or more of the successive iterations of method 700.

The method 700 may include the operation 712 of selecting (e.g., identifying, determining) one or more optimal correspondence estimations for the source Doppler point cloud and/or the target Doppler point cloud among a plurality of candidate correspondence estimations. In some embodiments, a correspondence estimation is a pair of points, where the first point of the pair is from the source point cloud and the second point of the pair is from the target point cloud. In some embodiments, the points in a pair of points are more closely related to one another than either of the points are to the other points in the opposing point cloud. In some embodiments, the signal processing unit 112 may be configured to select an optimal correspondence based on the determined surface geometry properties that are associated with the source Doppler point cloud and/or the target Doppler point cloud (e.g., from operation 708 and/or operation 710). In some embodiments, the signal processing unit 112 may be configured to predict Doppler measurements (e.g., Doppler information) for one or more points in the source point cloud and/or one or more points in the target point cloud based on what the signal processing unit 112 predicts the Doppler information could be for each of the points, and select an optimal correspondence based on the predicted Doppler measurements and the measured Doppler measurements. In some embodiments, the signal processing unit 112 may predict Doppler information before performing any measurements that are associated with the Doppler information. For example, the signal processing unit 112 may predict Doppler information without ever making (or having access to) a measurement of the Doppler information.

In some embodiments, the signal processing unit 112 may be configured to select an optimal correspondence based the (1) determined geometry properties that are associated with the source Doppler point cloud and/or the target Doppler point cloud, and/or (2) the Doppler channel information for the channel used to acquire the source Doppler point cloud and/or the target Doppler point cloud. In some embodiments, a plurality of candidate correspondence estimations may include a correspondence estimations determined based on surface geometry properties, a correspondence estimations determined based on predicted Doppler measurements and the measured Doppler measurements, and/or a correspondence estimations determined based on Doppler channel information.

The method 700 may include the operation 714 of performing (e.g., executing, running, implementing) a rigid motion optimization to transform (e.g., via a 6-DOF transformation) the source Doppler point cloud and the target Doppler point cloud by generating (e.g., estimating) a rigid motion transformation. In some embodiments, the signal processing unit 112 may be configured to perform the rigid motion optimization to transform the source Doppler point cloud and the target Doppler point cloud by using the information (e.g., geometry properties, Doppler information) and/or the one or more correspondence estimations.

The method 700 may include the operation 716 of removing outliers from one or more point clouds. For example, if a point cloud (e.g., a source point cloud or a target point cloud) included points indicative of one or more dynamic objects (e.g., moving pedestrians, moving vehicles, raindrops, snow falling, etc.) in the environment, but the same dynamic objects do not appear in the other point cloud (e.g., a source point cloud or a target point cloud), then the signal processing unit 112 may determine (and label) that these points are outliers. In some embodiments, the signal processing unit 112 may be configured to remove (e.g., filter, exclude, eliminate, reject) the outliers from the one or more point clouds and/or the rigid motion optimization.

The method 700 includes the operation 718 of performing an intermediate rigid motion optimization (sometimes referred to as, "second rigid transformation") to transform the source Doppler point cloud and the target Doppler point cloud after removing the one or more outliers.

The method 700 includes the operation 720 of determining whether the points clouds (e.g., source point cloud and target points cloud) have converged. For example, the signal processing unit 112 may be configured to determine whether the point clouds have converged by comparing a difference between a first transformation that was acquired from a first iteration of method 700 and a second transformation that was acquired from a second iteration of method 700 against a predetermined threshold. If the difference is less than the predetermined threshold, then the signal processing unit 112 may determine that the points clouds have converged. If the difference is greater than or equal to the predetermined threshold, then the signal processing unit 112 may determine that the points clouds have not converged. If the signal processing unit 112 determines that the point clouds have not converged, then the signal processing unit 112 may apply the intermediate rigid motion to the source Doppler point cloud, and repeat (e.g., iterate) any (or all) of the operations of method 700 to get the points clouds to converge. If the signal processing unit 112 determines that the point clouds has converged, then the signal processing unit 112 may proceed to operation 722, where the signal processing unit 112 applies the rigid motion estimate to the source point cloud (or the target point cloud) and stops the iterating because the final rigid motion estimate has been achieved.

Figure 8:
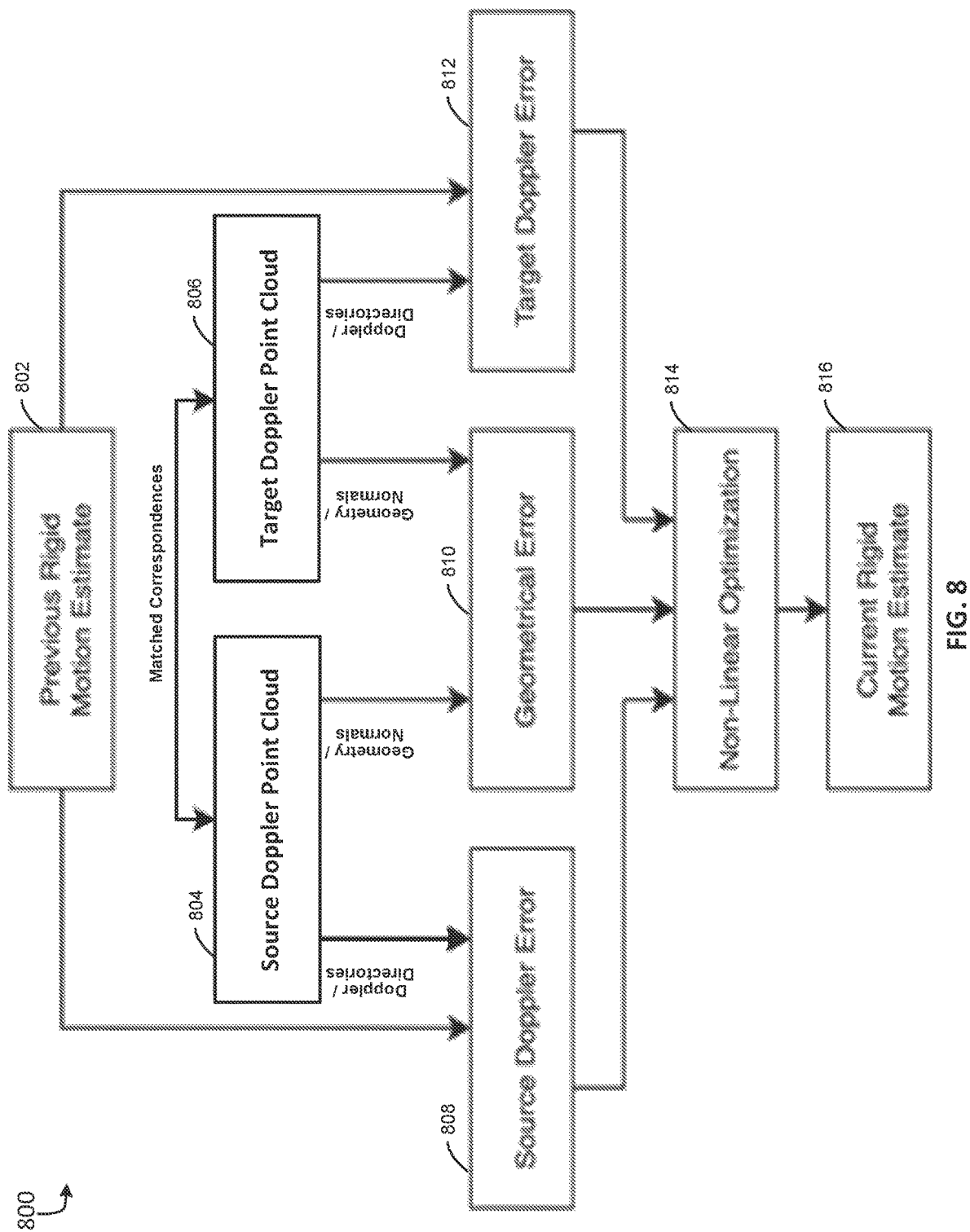
FIG. 8 is a flow diagram illustrating an example of a rigid motion optimization of a Doppler point set registration, according to some embodiments.

FIG. 8 is a flow diagram illustrating an example of a rigid motion optimization of a Doppler point set registration, according to some embodiments. Additional, fewer, or different operations may be performed in the method depending on the particular arrangement. In some embodiments, some or all operations of method 800 may be performed by one or more processors executing on one or more computing devices, systems, or servers (e.g., remote/networked servers or local servers). In some embodiments, method 800 may be performed by a signal processing unit, such as signal processing unit 112 in FIG. 1. In some embodiments, some or all operations of method 800 may correspond to operation 714 of method 700 in FIG. 7. Each operation may be re-ordered, added, removed, or repeated.

The method 800 may include the operation 802 of determining if a previous rigid motion (sometimes referred to as, "initial rigid motion estimate") for a source Doppler point cloud and/or a target Doppler point cloud is available, and if so, retrieve the previous rigid motion estimate. The method 800 may include the operation 804 of acquiring the source Doppler point cloud.

If the signal processing unit 112 performs the method 800 on two point clouds (sometimes referred to as, "Two-point-cloud case"), then the method 806 includes the operation 806 of acquiring the target Doppler point cloud. The method may include the operation 808 of determining a source Doppler error based on the source Doppler point cloud and/or the previous rigid motion estimate. In some embodiments, the operation 808 may include determining a target Doppler error based on the target Doppler point cloud and/or the previous rigid motion estimate.

If the signal processing unit 112 performs the method 800 on two point clouds (sometimes referred to as, "Two-point-cloud case"), then the method 800 includes the operation 812 of determining a target Doppler error based on the target Doppler point cloud and/or the previous rigid motion estimate. If the signal processing unit 112 performs the method 800 on one point cloud (sometimes referred to as, "One-point-cloud case"), then the signal processing units may omit and/or skip the operation 812 when performing method 800.

The method 800 may include the operation 810 of determining one or more geometry errors associated with the source Doppler point cloud and/or the target Doppler point cloud. If the signal processing unit 112 performs the method 800 on one point cloud (sometimes referred to as, "One-point-cloud case"), then the method 800 includes the operation 814 of generating a non-linear optimization based on the source Doppler point cloud and the predicted Doppler velocity for the source point cloud based on the dot product of the initial or previous rigid motion estimate and the direction vectors to the point measurements and/or the one or more geometry errors associated with the source Doppler point cloud and the target point cloud. If the signal processing unit 112 performs the method 800 on two point clouds (sometimes referred to as, "Two-point-cloud case"), then the method 800 includes the operation 814 of generating a non-linear optimization based on the error between the source Doppler point cloud and the predicted Doppler velocity for the source point cloud based on the dot product of the initial or previous rigid motion estimate and the direction vectors to the source point measurements, the error between the target Doppler point cloud and the predicted Doppler velocity for the target point cloud based on the dot product of the initial or previous rigid motion estimate and the direction vectors to the target point measurements, and/or the one or more geometry errors associated with the source Doppler point cloud and the target Doppler point cloud.

The method may include the operation 816 of generating a current rigid motion estimate based on the non-linear optimization.

Figure 9:
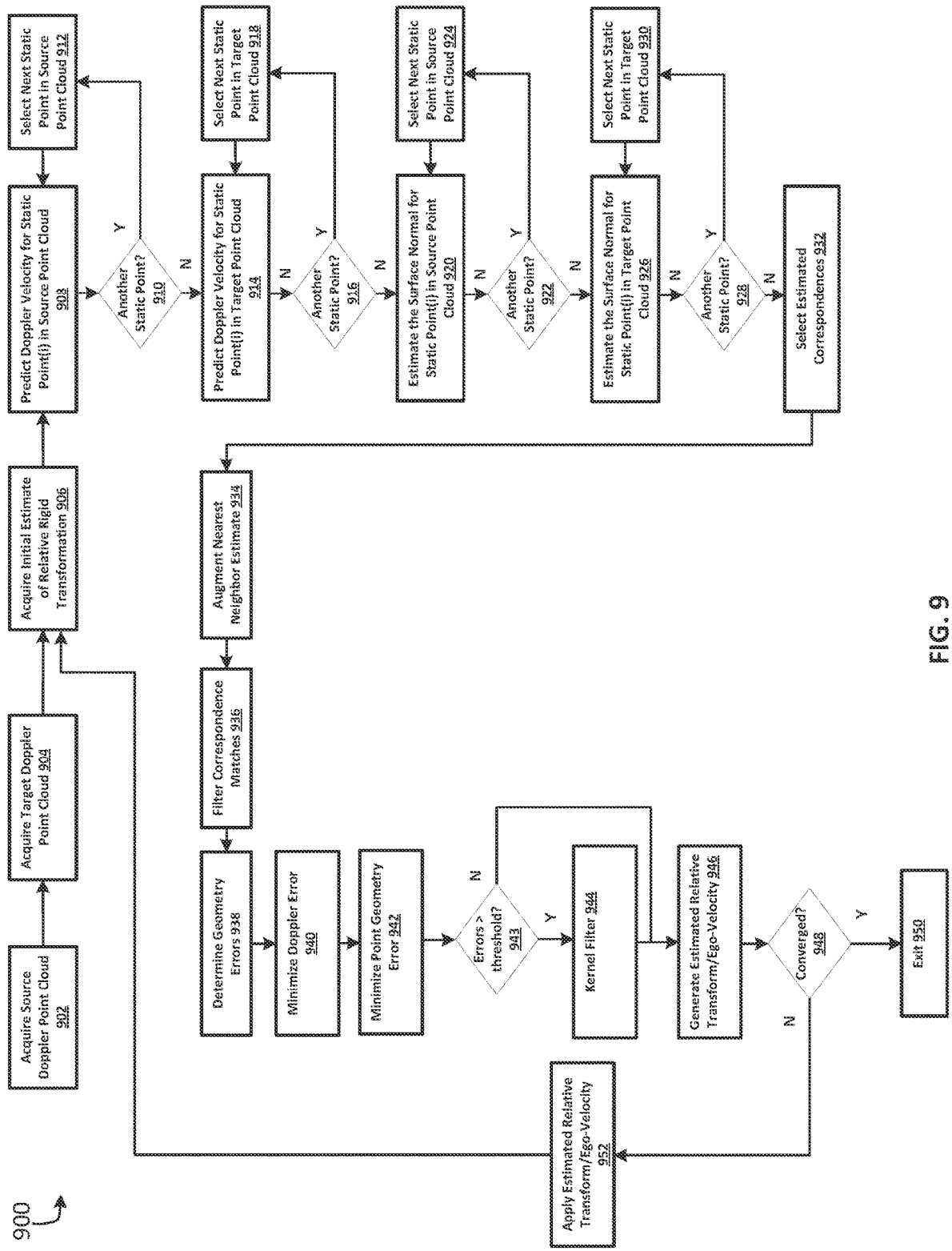
FIG. 9 is a flow diagram illustrating an example method for performing a Doppler point set registration.

FIG. 9 is a flow diagram illustrating an example method for performing a Doppler point set registration, according to some embodiments. In some embodiments, the method 900 may predict the relative rigid transformation between two point sets (e.g., with Doppler velocity information) that aligns the source point set with the target point set. In some embodiments, the relative transformation (T) to be estimated by method 900 may be equivalent to the ego-velocity (v) and/or related by T=v*dt, where dt is the time difference between the acquisition timestamps of source and target point sets. In some embodiments, references to estimating relative transformation and ego-velocity may be used interchangeably (e.g., have the same meaning). In some embodiments, having the initial/current relative transformation or initial/current ego-velocity at the current iteration of ICP may be used interchangeably. Additional, fewer, or different operations may be performed in the method 900 depending on the particular arrangement. In some embodiments, some or all operations of method 900 may be performed by one or more processors executing on one or more computing devices, systems, or servers (e.g., remote/networked servers or local servers). In some embodiments, method 900 may be performed by a signal processing unit, such as signal processing unit 112 in FIG. 1. Each operation may be re-ordered, added, removed, or repeated.

In some embodiments, the method 900 may include the operation 902 of acquiring a source Doppler point cloud (sometimes referred to as, "source Doppler point cloud") with measured Doppler velocity readings. The method 900 may include the operation 904 of acquiring a target point cloud (sometimes referred to as, "target Doppler point cloud") with measured Doppler velocity readings. In some embodiments, if the signal processing unit 112 performs the method 900 on one point cloud (sometimes referred to as, "One-point-cloud case"), then the signal processing unit 112 may skip the acquisition of Doppler measurements in operation 904 (geometry may still be required).

The method 900 may include the operation 906 of acquiring an initial estimate of relative rigid transformation (or ego-velocity) between the source and target point clouds, and seeding the optimization with the initial estimate of relative rigid transformation (or ego-velocity) to improve convergence of the estimated relative transformation. In some embodiments, the signal processing unit 112 may be configured to set the initial estimate of relative rigid transformation (or ego-velocity) to zero. In some embodiments, the signal processing unit 112 may be configured to approximate the initial estimate of relative rigid transformation (or ego-velocity) using the (median) Doppler velocity information from the point cloud and/or other sensors, such as Inertial Measurement Unit (IMU), Global Navigation Satellite System (GNSS), and/or odometry.

The method 900 may include the operation 908 of predicting a Doppler velocity for static point (i) in the source point cloud using the current estimate of the ego-velocity/relative transformation and/or the direction of observation to the static point (i). In some embodiments, the signal processing unit 112 acquires the static point (i) from the x-y-z position of the source point sensed.

The method 900 may include the operation 910 of determining whether the source point cloud includes another static point (i+1). In some embodiments, if the signal processing unit 112 determines that there is another static point in the source point cloud, then the signal processing unit 112 proceeds to operation 912 to select the next static point (e.g., i+1) in the source point cloud and proceed to operation 908 to repeat operation 908 using the next static pint (e.g., i+1). In some embodiments, if the signal processing unit 112 determines that there is not another static point in the source point cloud, then the signal processing unit 112 proceeds to operation 914. In some embodiments, prior to performing operation 910, the signal processing unit 112 may pre-filter one or more (or all) dynamic points from the source point cloud.

The method 900 may include the operation 914 of predicting a Doppler velocity for static point (i) in the static point cloud using the dot product of the current estimate of the ego-velocity/relative transformation and the direction of observation to the static point (i). In some embodiments, the signal processing unit 112 acquires the static point (i) from the x-y-z position of the source point sensed.

The method 900 may include the operation 916 of determining whether the target point cloud includes another static point (i+1). In some embodiments, if the signal processing unit 112 determines that there is another static point in the target point cloud, then the signal processing unit 112 proceeds to operation 918 to select the next static point (e.g., i+1) in the target point cloud and proceed to operation 914 to repeat operation 914 using the next static point (e.g., i+1). In some embodiments, if the signal processing unit 112 determines that there is not another static point in the target point cloud, then the signal processing unit 112 proceeds to operation 920. In some embodiments, prior to performing operation 914, the signal processing unit 112 may pre-filter one or more (or all) dynamic points from the target point cloud.

The method 900 may include the operation 920 of estimating the surface normal for static point (i) in the source point cloud based on one or more neighboring points. In some embodiments, the signal processing unit 112 performs operation 920 for the point-to-plane ICP (as discussed herein) and/or the point-to-point ICP (as discussed herein). In some embodiments, the signal processing unit 112 determines to not perform operation 920 and 926 for the point-to-point ICP. In some embodiments, the signal processing unit 112 may only perform operation 920 and 926 for the first iteration of the method 900.

The method 900 may include the operation 922 of determining whether the source point cloud includes another static point (i+1). In some embodiments, if the signal processing unit 112 determines that there is another static point in the source point cloud, then the signal processing unit 112 proceeds to operation 924 to select the next static point (e.g., i+1) in the source point cloud and proceed to operation 920 to repeat operation 920 using the next static point (e.g., i+1). In some embodiments, if the signal processing unit 112 determines that there is not another static point in the source point cloud, then the signal processing unit 112 proceeds to operation 926.

The method 900 may include the operation 926 of estimating the surface normal for static point (i) in the target point cloud based on one or more neighboring points. In some embodiments, the signal processing unit 112 performs operation 926 for the point-to-plane ICP (as discussed herein) and/or the point-to-point ICP (as discussed herein). In some embodiments, the signal processing unit 112 determines to not perform operation 926 for the point-to-point ICP.

The method 900 may include the operation 928 of determining whether the target point cloud includes another static point (i+1). In some embodiments, if the signal processing unit 112 determines that there is another static point in the target point cloud, then the signal processing unit 112 proceeds to operation 930 to select the next static point (e.g., i+1) in the target point cloud and proceed to operation 926 to repeat operation 926 using the next static point (e.g., i+1). In some embodiments, if the signal processing unit 112 determines that there is not another static point in the source point cloud, then the signal processing unit 112 proceeds to operation 932.

The method 900 may include the operation 932 of selecting one or more estimated correspondences. In some embodiments, the signal processing unit 112 may select one or more estimated correspondences by determining the nearest neighboring point in the other point set (e.g., source point cloud, target point cloud). In some embodiments, as the relative transform estimate improves over the one or more iterations (e.g., by repeating one or more operations of method 900), the nearest neighbor estimate may approach (e.g., get closer) to the actual corresponding point.

The method 900 may include the operation 934 of augmenting the nearest neighbor estimate to generate an augmented nearest neighbor estimate. In some embodiments, the signal processing unit 112 may augment the nearest neighbor estimate by picking points that are closer in the Doppler velocity space. In some embodiments, the signal processing unit 112 is able to accurately select the more suitable neighbor in the other point cloud (e.g., source point cloud, target point cloud) that also belongs to the static region because the point clouds include the Doppler velocity information (as discussed with respect to operation 902 and operation 904). In some embodiments, the Doppler velocity information may improve the capability for the signal processing unit 112 to match correspondences that belong to the same regions in the environment. In some embodiments, non-Doppler point clouds may be blind to static/dynamic points, whereas the signal processing unit 112 can use this additional Doppler velocity information info to help differentiate them and pick better matches.

The method 900 may include the operation 936 of filtering correspondence matches. In some embodiments, the signal processing unit 112 filters the correspondence matches where the Doppler errors are greater than or equal to a predetermined threshold, such that inclusion of the errors may corrupt the estimated relative transform performed at operation 946. In some embodiments, the signal processing unit 112 may filter out one or more correspondences that correspond to (or are associated with) a geometry distance that is greater than or equal to a predetermined threshold. For example, the signal processing unit 112 may filter out correspondences that correspond to distances that are greater than or equal to 5 meters. In some embodiments, after performing operation 938 at any pre-determined distance, the signal processing unit 112 may have acquired a first set of properties (e.g., an X-Y-Z point measurement, an estimated surface normal, a Doppler velocity measurement, a predicted Doppler measurement, and an estimated corresponding point) for the source point cloud and a second set of properties (e.g., an X-Y-Z point measurement, an estimated surface normal, a Doppler velocity measurement, a predicted Doppler measurement, and an estimated corresponding point) for the target point cloud (e.g., for the Two-Point cloud case).

The method 900 may include the operation 938 of determining one or more geometry errors over pairs/correspondences of (source, target) static points. In some embodiments, the quality of the estimated transform that is acquired by performing an optimization is based on the quality of the correspondence points that are used to generate the estimated transform.

The method of 900 may include the operation of 940 of minimizing the Doppler error on both points individually. In some embodiments, when performing the method 900 on a single point cloud (e.g., source point cloud or target point cloud), the signal processing unit 112 may minimize the Doppler error on one of the points of the point cloud. In some embodiments, the signal processing unit 112 may calculate the Doppler error by subtracting the predicted Doppler measurement from the measured Doppler measurement.

In some embodiments, if the signal processing unit 112 performs the method 900 on one point cloud (sometimes referred to as, "One-point-cloud case"), then the signal processing unit 112 may skip some of the operations of the method 900 that are related to predicting and computing Doppler velocities or errors with the target point cloud (geometry is still required for registration).

In some embodiments, the signal processing unit 112 may minimize the inter point-cloud geometry error and the source Doppler error, but not the target Doppler error. In some embodiments, the signal processing unit 112 may minimize the target Doppler error, but not the inter point-cloud geometry error and the source Doppler error. In some embodiments, one of the point clouds may belong to a pre-constructed map (e.g., a high-definition (HD) map) or a point set obtained from a different sensing modality (e.g., from triangulation of features observed on multiple images) that may not have Doppler measurements to minimize the Doppler error in operation 940, but may still have the structure to minimize the geometry error.

The method of 900 may include the operation of 942 of minimizing the point geometry error. In some embodiments, the signal processing unit 112 calculates the geometry error by subtracting the target X-Y-Z from the source X-Y-Z. In some embodiments, the signal processing unit 112 minimizes the point geometry error for point-to-plane ICP by subtracting the target X-Y-Z from the source X-Y-Z to generate a difference, and multiplying the difference by a factor (e.g., normal target). In some embodiments, a factor may correspond to an error along the direction of the target point normal. In some embodiments, a factor may correspond to an error, and computing the dot product using the error and the target point normal.

The method 900 may include the operation 943 of determining whether one or more of the geometry errors from operation 940 and/or operation 942 are greater than or equal to a predetermined threshold. In some embodiments, if the signal processing unit 112 determines that one or more the geometry or the Doppler velocity errors from operation 940 and/or operation 942 are greater than or equal to a predetermined threshold, then the Signal processing unit 112 proceeds to operation 944, else the signal processing unit 112 proceeds to operation 946 (i.e., skips operation 944.

The method of 900 may include the operation of 944 of lowering (e.g., decreasing, reducing) a weight associated with one or more outlier points (as determined from preceding operations of method 900) by using a robust kernel to reduce the impact of the outliers on the accuracy of the estimated relative transform. In some embodiments, operation 944 is an additional method that the signal processing unit 112 may perform to filter out possible outliers that still get through the filtering performed at operation 936 and/or operation 938. In some embodiments, robust kernel filtering may down weigh (e.g., depress, dampen, reduce, downweigh) points with high Doppler errors and/or points with high geometry errors.

The method of 900 may include the operation of 944 of generating an estimated relative transform (or ego-velocity). In some embodiments, the signal processing unit 112 may use the estimated relative transform to incrementally transform the source point cloud and also help pick better correspondence matches for the next iteration The method of 900 may include the operation of 948 of determining whether the estimated relative transform (or ego-velocity) and/or correspondences have converged (e.g., the error between the measured point cloud and the reference point cloud or map is small enough). In some embodiments, the signal processing unit 112 may determine that the estimated relative transform and/or correspondences have converged, and proceed to operation 950 to exit the method 900, else (if/when convergence is not achieved) the signal processing unit 112 proceeds to operation 952.

The method of 900 may include the operation of 952 of applying the estimated relative transform (or ego-velocity) to the source point cloud and/or the target point cloud, and proceed to operation 906 to repeat (sometimes referred to as, "the next iteration") the one or more operations of method 900. For example, the signal processing unit 112 may skip operations 902 and 904 because the point clouds may already be acquired. In some embodiments, the signal processing unit 112 may use the estimated relative transform (or ego-velocity) to select new correspondence matches for the next iteration of method 900.

In some embodiments, if the estimated relative transformation has not changed much (e.g., beyond a predetermined convergence threshold) in successive iterations of the method 900, then the signal processing unit 112 may determine that the Doppler ICP algorithm of method 900 has converged and exit this loop (e.g., operation 950).

In some embodiments, if the signal processing unit 112 determines to have an acceptable confidence level (e.g., a confidence level that is greater than or equal to a predetermined threshold to indicate an acceptable confidence level) over the estimated ego-velocity acquired from performing method 900 (e.g., after a few iterations or just the first iteration), then the signal processing unit 112 may use this information to further filter out one or more (or all) the dynamic object points in the scene. In some embodiments, the Doppler velocity prediction operations (e.g., operation 908, operation 914) may only apply to static points; thus, filtering out the dynamic points may help remove potential outliers from the optimization. In some embodiments, the Doppler velocity prediction operations (e.g., operation 908, operation 914) may apply to static points and dynamic points. In some embodiments, when applying the Doppler velocity prediction operations (e.g., operation 908, operation 914) to dynamic points, the filtering operations (e.g., operation 936, operation 938, etc.) may be skipped.

In some embodiments, geometry and/or structure of a point cloud may refer to the X-Y-Z position of the points from the LIDAR sensor (e.g., signal processing unit 112). In some embodiments, geometric properties of a point may refer to the surface normal estimated at that point, curvature properties, spherical coordinates representation, or a combination of these. In some embodiments, the signal processing unit 112 performs Doppler ICP on one point cloud (sometimes referred to as, "One-point-cloud case") by minimizing the Doppler error (e.g., predicted—measured) only, or either source point cloud or target point cloud. In some embodiments, the signal processing unit 112 performs Doppler ICP on two point clouds (sometimes referred to as, "Two-point-cloud case") by minimizing the Doppler error (e.g., predicted—measured) on both source/target point sets individually.

In some embodiments, outliers (e.g., for Doppler ICP optimization purposes) may refer to points that belong to non-static objects in the environment or point measurements that are generated due to different sources of noise. In some embodiments, one or more outliers may corrupt the transformation estimation. In some embodiments, the signal processing unit 112 may filter one or more outliers prior to generating an estimated relative transform to improve the Doppler ICP.

FIG. 10 is a flow diagram illustrating an example method for performing a Doppler point set registration, according to some embodiments. Additional, fewer, or different operations may be performed in the method depending on the particular arrangement. In some embodiments, some or all operations of method 1000 may be performed by one or more processors executing on one or more computing devices, systems, or servers (e.g., remote/networked servers or local servers). In some embodiments, method 1000 may be performed by a signal processing unit, such as signal processing unit 112 in FIG. 1. Each operation may be re-ordered, added, removed, or repeated.

The method 1000 may include the operation 1002 of determining an alignment between one or more points of a first point set, from the plurality of different point sets, and one or more points of a second point set, from the plurality of different point sets, based on geometry measurements and Doppler velocity measurements for the one or more points of the first point set and the second point set. The method 1000 may include the operation 1004 of predicting a first set of Doppler velocity information for the first point set based on an initial motion estimate of a sensor system measured relative to one or more static object velocities corresponding to the one or more points for the first point set to produce a first predicted set of Doppler velocity information for the first point set. The method 1000 may include the operation 1006 of comparing a second set of Doppler velocity information measured for the one or more points of the first point set and the first predicted set of Doppler velocity information to compute one or more Doppler velocity errors. The method 1000 may include the operation 1008 of producing a transform that aligns the one or more points of the first point set with the one or more points of the second point set that approaches the point set convergence threshold to produce to produce aligned point clouds in a common reference frame. In some embodiments, operation 1004, operation 1006, and/or operation 1008 may be performed provided that the alignment does not satisfy a point set alignment threshold, wherein the point set alignment threshold represents a geometric alignment error threshold between the first and second point sets based on a first pair of corresponding points between the one or more points of both the first and second point sets.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   predicting, based on information measured by a sensor system, a first set of Doppler velocity information for a first point set to produce a first predicted set of Doppler velocity information for the first point set;
   determining, based on the first predicted set of Doppler velocity information and a second set of Doppler velocity information measured for one or more points of a second point set, one or more Doppler velocity errors; and
   producing, based on the one or more Doppler velocity errors, a transform that aligns the one or more points of the first point set with one or more points of the second point set to produce one or more scan frames.

2. The method of claim 1, further comprising:
   determining, based on geometry measurements, that a misalignment exists between the one or more points of the first point set and the one or more points of the second point set; and
   computing a difference between the first predicted set and the second set of Doppler velocity information to minimize the one or more Doppler velocity errors and one or more geometric measurement errors from the geometry measurements between the one or more points of both the first point set and the second point set to approach a point set convergence threshold.

3. The method of claim 1, further comprising:
   predicting a third set of Doppler velocity information for the second point set based on an initial motion estimate of a LIDAR system measured relative to one or more static object velocities corresponding to the one or more points for the second point set to produce a second predicted set of Doppler velocity information for the second point set; and
   selecting a second pair of corresponding points between the one or more points of both the first and second point sets based on the second predicted set of Doppler velocity information and the first set of Doppler velocity information measured for the one or more points of the first point set and rejecting correspondence pairs that exceed a Doppler velocity compatibility threshold to prevent optimizing on outlier correspondences or non-static points from the one or more points of both the first and second point sets.

4. The method of claim 3, wherein the initial motion estimate is based on a median Doppler velocity calculated using the first point set.

5. The method of claim 1, wherein the predicting the first set of Doppler velocity information for the first point set comprises using a sensor system, and further comprising:
   using a second pair of corresponding points based on a subsequent motion estimate of the sensor system between the one or more points of the first and second point sets:
      predicting a third set of Doppler velocity information for the first point set based on a subsequent motion estimate of the sensor system measured relative to the one or more static object velocities to produce a second predicted set of Doppler velocity information for the first point set; and
      comparing the second set of Doppler velocity information and the second predicted set of Doppler velocity information to compute a new set of one or more Doppler velocity errors.

6. The method of claim 1, wherein the first and second points sets are point clouds.

7. The method of claim 1, wherein the first point set is a point cloud and the second point set is a static map.

8. The method of claim 1, wherein the transform comprises a subsequent motion estimate of the sensor system.

9. The method of claim 1, wherein the first and second points sets are interchanged producing an inverse of rigid transformation to align the first and second points sets.

10. The method of claim 1, further comprising:
    identifying a misalignment between the one or more points of the first point set and the one or more points of the second point set, wherein the predicting, using the sensor system, the first set of Doppler velocity information for the first point set is responsive to identifying the misalignment between the one or more points of the first point set and the one or more points of the second point set.

11. A system comprising:
    a memory; and
    a processor, operatively coupled with the memory, to:
    predict, based on information measured by a sensor system, a first set of Doppler velocity information for a first point set to produce a first predicted set of Doppler velocity information for the first point set;
    determine, based on the first predicted set of Doppler velocity information and a second set of Doppler velocity information measured for one or more points of a second point set, one or more Doppler velocity errors; and
    produce, based on the one or more Doppler velocity errors, a transform that aligns the one or more points of the first point set with one or more points of the second point set to produce one or more scan frames.

12. The system of claim 11, wherein the processor is to further:
    determine, based on geometry measurements, that a misalignment exists between the one or more points of the first point set and the one or more points of the second point set; and
    compute a difference between the first predicted set and the second set of Doppler velocity information to minimize the one or more Doppler velocity errors and one or more geometric measurement errors from the geometry measurements between the one or more points of both the first point set and the second point set to approach a point set convergence threshold.

13. The system of claim 11, wherein the processor is to further:
    predict a third set of Doppler velocity information for the second point set based on an initial motion estimate of a LIDAR system measured relative to one or more static object velocities corresponding to the one or more points for the second point set to produce a second predicted set of Doppler velocity information for the second point set; and
    select a second pair of corresponding points between the one or more points of both the first and second point sets based on the second predicted set of Doppler velocity information and the first set of Doppler velocity information measured for the one or more points of the first point set and rejecting correspondence pairs that exceed a Doppler velocity compatibility threshold to prevent optimizing on outlier correspondences or non-static points from the one or more points of both the first and second point sets.

14. The system of claim 13, wherein the initial motion estimate is based on a median Doppler velocity calculated using the first point set.

15. The system of claim 11, wherein to predict the first set of Doppler velocity information for the first point set, the processor to use a sensor system, and wherein the processor is to further:
- using a second pair of corresponding points based on a subsequent motion estimate of the sensor system between the one or more points of the first and second point sets:
- predict a third set of Doppler velocity information for the first point set based on a subsequent motion estimate of the sensor system measured relative to the one or more static object velocities to produce a second predicted set of Doppler velocity information for the first point set; and
- compare the second set of Doppler velocity information and the second predicted set of Doppler velocity information to compute a new set of one or more Doppler velocity errors.

16. The system of claim 11, wherein the first and second points sets are point clouds.

17. The system of claim 11, wherein the first point set is a point cloud and the second point set is a static map.

18. The system of claim 11, wherein the transform comprises a subsequent motion estimate of the sensor system.

19. The system of claim 11, wherein the first and second points sets are interchanged producing an inverse of rigid transformation to align the first and second points sets.

20. The system of claim 11, wherein the processor is to further to:
- identify a misalignment between the one or more points of the first point set and the one or more points of the second point set, wherein to predict, using the sensor system, the first set of Doppler velocity information for the first point set is responsive to the processor to identify the misalignment between the one or more points of the first point set and the one or more points of the second point set.

\* \* \* \* \*